(12) United States Patent
Weinmaier et al.

(10) Patent No.: US 9,234,087 B2
(45) Date of Patent: Jan. 12, 2016

(54) PREPARATION FOR INITIATING RADICAL REACTIONS

(75) Inventors: Josef Helmut Weinmaier, Muhldorf (DE); Dominik Hermann, Dachau (DE); Martin Kunz, Dettenhausen (DE)

(73) Assignee: UNITED INITIATORS GMBH & CO. KG, Pullach (DE)

( * ) Notice: Subject to any disclaimer, the term of this patent is extended or adjusted under 35 U.S.C. 154(b) by 1392 days.

(21) Appl. No.: 12/996,438

(22) PCT Filed: Jun. 4, 2009

(86) PCT No.: PCT/EP2009/004017
§ 371 (c)(1),
(2), (4) Date: Mar. 25, 2011

(87) PCT Pub. No.: WO2009/146916
PCT Pub. Date: Dec. 10, 2009

(65) Prior Publication Data
US 2011/0272628 A1 Nov. 10, 2011

(30) Foreign Application Priority Data
Jun. 6, 2008 (EP) .................................... 08157736

(51) Int. Cl.
*C08K 5/14* (2006.01)

(52) U.S. Cl.
CPC ............. *C08K 5/14* (2013.01); *C08K 2201/014* (2013.01)

(58) Field of Classification Search
None
See application file for complete search history.

(56) References Cited

U.S. PATENT DOCUMENTS

| 1,913,775 | A | | 6/1933 | Straub |
| 4,560,495 | A | * | 12/1985 | Kato ..................... 252/186.23 |
| 4,743,671 | A | | 5/1988 | Dorn et al. |
| 5,057,479 | A | * | 10/1991 | Bock ............................. 502/160 |
| 5,162,280 | A | | 11/1992 | Bock |
| 6,362,299 | B1 | | 3/2002 | Wolfer et al. |

FOREIGN PATENT DOCUMENTS

| CS | 224167 | 12/1983 |
| EP | 0235537 | 1/1987 |
| EP | O235537 | 1/1987 |
| EP | 1004622 | 5/2000 |
| EP | 1233014 | 8/2002 |
| EP | 09004017 | 10/2009 |
| JP | 10139890 | 5/1998 |
| WO | 9936466 | 7/1999 |
| WO | WO-9936466 | 7/1999 |

OTHER PUBLICATIONS

International Search Report for PCT/EP2009/004017 dated Oct. 26, 2009, 10 pages.

* cited by examiner

*Primary Examiner* — Tanisha Diggs
(74) *Attorney, Agent, or Firm* — Kilpatrick Townsend & Stockton LLP

(57) ABSTRACT

A preparation, comprising a mixture of dibenzoyl peroxides where the mixture of dibenzoyl peroxides contains 50 to 99.7 mole % of a symmetric dibenzoyl peroxide and 0.3 to 50 mole % asymmetric dibenzoyl peroxides, shows a reduced decomposition temperature of the peroxides compared to the symmetric dibenzoyl peroxide and is suitable for hot cross-linking silicone rubber. The preparation can be produced by reacting a mixture containing a first benzoyl chloride and a second benzoyl chloride that is different therefrom with hydrogen peroxide, wherein the mixture of benzoyl chlorides contains 70 to 99.7 mole % of the first benzoyl chloride and 0.3 to 30 mole % of the second benzoyl chloride.

7 Claims, No Drawings

PREPARATION FOR INITIATING RADICAL REACTIONS

PRIOR RELATED APPLICATIONS

This application is a National Phase application of PCT/EP2009/004017 filed Jun. 4, 2009 which claims priority to EP 08 157 736 3 filed Jun. 6, 2008, both of which are incorporated by reference herein in their entirety.

The invention concerns preparations for initiating radical reactions which are suitable especially for hot cross-linking silicone rubber.

Dibenzoyl peroxide and symmetrically-substituted dibenzoyl peroxides are known to a person skilled in the art as initiators for radical reactions. In this case the initiator effect is achieved by heating which results in the radical decomposition of the dibenzoyl peroxide with formation of phenyl radicals or substituted phenyl radicals, respectively.

Technically important radical reactions which can be initiated by dibenzoyl peroxide and symmetrically-substituted dibenzoyl peroxides are radical polymerizations and the radical cross-linking of polymers.

Of particular importance is the production of hot-vulcanized silicone rubber by cross-linking a polyorganosiloxane. The production of hot-vulcanized silicone rubber articles usually comprises an extrusion or injection-moulding process with subsequent cross-linking at an elevated temperature within or outside a mould. For this purpose the peroxide is mixed into the silicone rubber in a kneader or on a roller mill and the resulting mixture is then processed on an extruder, an injection moulding machine, a press or another forming device. After this forming the cross-linking reaction is then initiated in the hot-vulcanization by increasing the temperature above the decomposition temperature of the peroxide. The symmetrically-substituted dibenzoyl peroxides bis-(2,4-dichlorobenzoyl) peroxide or di-(4-methylbenzoyl) peroxide are usually used in this process as initiators, which are usually introduced as mixtures with silicone oil to improve the incorporation into the silicone rubber.

EP 1 004 622 describes the use of mixtures of di-(4-methylbenzoyl) peroxide and one or more peroxides from the group of dibenzoyl peroxide, dicumyl peroxide, 2,5-dimethylhexane-2,5-di-tert-butyl peroxide and di-tert-butyl peroxide for the hot-vulcanization of silicone rubber. In this process the hot-vulcanization takes place under the same conditions as with di-(4-methylbenzoyl) peroxide alone. The products obtained with the mixtures have better mechanical properties and do not have a yellow colouration and their odour is less unpleasant.

WO 99/36466 discloses the asymmetrically-substituted dibenzoyl peroxides o, p'-bis(methylbenzoyl) peroxide and m, p'-bis(methylbenzoyl) peroxide as initiators for increasing the melt viscosity of polypropylene.

Two requirements are made on initiators for radical reactions which are usually contradictory. The initiator should, on the one hand, have a lowest possible decomposition temperature of the peroxides so that the radical reaction can be initiated at a lower temperature which saves energy and avoids temperature-related deterioration of the product properties, or so that a more rapid reaction can take place at the same temperature which for example enables the processing capacity to be increased in the case of a radical cross-linking of polymers. The initiator should, however, on the other hand, be sufficiently stable when stored and the stability should preferably be such that the initiator can be stored and transported without cooling which in the case of an organic peroxide classified as type D requires a self-accelerating decomposition temperature (SADT) of at least 50° C. and no effect or a slight effect on heating when enclosing the series E tests of the "Recommendations on the transport of dangerous goods, manual of tests and criteria" of the United Nations.

It was now surprisingly found that preparations which contain at least 50 mole % of a symmetric dibenzoyl peroxide and 0.3 to 50 mole % of an asymmetric dibenzoyl peroxide have a considerably lower decomposition temperature of the peroxides than the corresponding symmetric dibenzoyl peroxide without lowering the self-accelerating decomposition temperature to the same extent.

Hence, the subject matter of the invention is a preparation for initiating radical reactions which comprises a mixture of dibenzoyl peroxides wherein the mixture of dibenzoyl peroxides contains 50 to 99.7 mole % of a symmetric dibenzoyl peroxide and 0.3 to 50 mole % of asymmetric dibenzoyl peroxides.

The invention additionally concerns the use of the preparation according to the invention for hot cross-linking silicone rubber as well as a process for producing the preparation according to the invention which comprises reacting a mixture of benzoyl chlorides containing a first benzoyl chloride and a second benzoyl chloride which is different therefrom, with hydrogen peroxide wherein the mixture of benzoyl chlorides contains 70 to 99.7 mole % of the first benzoyl chloride and 0.3 to 30 mole % of the second benzoyl chloride.

The invention additionally concerns new asymmetrically-substituted dibenzoyl peroxides which contain a 2,4-dichlorobenzoyl residue and a substituted benzoyl residue from the group of 2-chlorobenzoyl, 3-chlorobenzoyl, 4-chlorobenzoyl, 2,3-dichlorobenzoyl, 2,5-dichlorobenzoyl, 2,6-dichlorobenzoyl, 3,4-dichlorobenzoyl, 3,5-dichlorobenzoyl, 2,3,4-trichlorobenzoyl, 2,3,5-trichlorobenzoyl, 2,3,6-trichlorobenzoyl, 2,4,5-trichlorobenzoyl, 2,4,6-trichlorobenzoyl, 3,4,5-trichlorobenzoyl, 2,3,4,5-tetrachlorobenzoyl, 2,3,4,6-tetrachlorobenzoyl, 2,3,5,6-tetrachlorobenzoyl and pentachlorobenzoyl or a 4-methylbenzoyl residue and a substituted benzoyl residue from the group of 2,3-dimethylbenzoyl, 2,4-dimethylbenzoyl, 2,5-dimethylbenzoyl, 2,6-dimethylbenzoyl, 3,4-dimethylbenzoyl, 3,5-dimethylbenzoyl, 2,3,4-trimethylbenzoyl, 2,3,5-trimethylbenzoyl, 2,3,6-trimethylbenzoyl, 2,4,5-trimethylbenzoyl, 2,4,6-trimethylbenzoyl, 3,4,5-trimethylbenzoyl, 2,3,4,5-tetramethylbenzoyl, 2,3,4,6-tetramethylbenzoyl, 2,3,5,6-tetramethylbenzoyl and pentamethylbenzoyl.

The preparation according to the invention for initiating radical reactions comprises a mixture of dibenzoyl peroxides. This mixture of dibenzoyl peroxides contains 50 to 99.7 mole % of a symmetric dibenzoyl peroxide and 0.3 to 50 mole % asymmetric dibenzoyl peroxides. Symmetric dibenzoyl peroxides within the sense of the invention are unsubstituted dibenzoyl peroxide and substituted dibenzoyl peroxides which have two identically substituted benzoyl residues. Asymmetric dibenzoyl peroxides within the sense of the invention are dibenzoyl peroxides which have an unsubstituted or a substituted benzoyl residue or two differently substituted benzoyl residues. The symmetric dibenzoyl peroxide is preferably a substituted dibenzoyl peroxide with two identically substituted benzoyl residues.

The mixture preferably contains 80 to 97 mole % of a symmetric dibenzoyl peroxide and 1 to 20 mole % asymmetric dibenzoyl peroxides. The decomposition temperature of the peroxides can be considerably reduced compared to the symmetric dibenzoyl peroxide without lowering the self-accelerating decomposition temperature to the same extent by the selection of the proportions of symmetric dibenzoyl peroxide and asymmetric dibenzoyl peroxides.

The asymmetric dibenzoyl peroxides of the mixture preferably contain a benzoyl residue which has the same substitution pattern as the benzoyl residue of the symmetric dibenzoyl peroxide contained in the mixture. This embodiment has the advantage that the products formed when the benzoyl peroxides in the mixture decompose, differ only slightly from the products that are formed when the symmetric dibenzoyl peroxide decomposes. The inventive preparations according to this embodiment can therefore be used instead of preparations which only contain the symmetric dibenzoyl peroxide without changes occurring in the properties of the end products produced using the preparation.

In addition to the symmetric dibenzoyl peroxide present in an amount of 50 to 99.7 mole %, the mixture can additionally contain further symmetric dibenzoyl peroxides. The proportion of additional symmetric dibenzoyl peroxides in the mixture is, however, preferably less than 5 mole %, particularly preferably less than 1 mole %.

In a preferred embodiment the preparation according to the invention contains bis-(2,4-dichlorobenzoyl) peroxide as the symmetric dibenzoyl peroxide. This preferred embodiment enables silicone rubber to be hot-vulcanized at a particularly high cross-linking rate.

Preparations are particularly preferred which contain bis-(2,4-dichlorobenzoyl) peroxide and an asymmetric dibenzoyl peroxide where the asymmetric dibenzoyl peroxide contains a 2,4-dichlorobenzoyl residue and a residue from the group of benzoyl, 2-chlorobenzoyl, 3-chlorobenzoyl, 4-chlorobenzoyl, 2,3-dichlorobenzoyl, 2,5-dichlorobenzoyl, 2,6-dichlorobenzoyl, 3,4-dichlorobenzoyl, 3,5-dichlorobenzoyl, 2,3,4-trichlorobenzoyl, 2,3,5-trichlorobenzoyl, 2,3,6-trichlorobenzoyl, 2,4,5-trichlorobenzoyl, 2,4,6-trichlorobenzoyl, 3,4,5-trichlorobenzoyl, 2,3,4,5-tetrachlorobenzoyl, 2,3,4,6-tetrachlorobenzoyl, 2,3,5,6-tetrachlorobenzoyl and pentachlorobenzoyl. These particularly preferred preparations can be used instead of pure bis-(2,4-dichlorobenzoyl) peroxide without changes in the formulation for the hot-vulcanization of silicone rubber and enable an increased cross-linking rate compared to bis-(2,4-dichlorobenzoyl) peroxide.

In a further preferred embodiment the preparation according to the invention contains di-(4-methylbenzoyl) peroxide as the symmetric dibenzoyl peroxide.

Preparations are particularly preferred which contain di-(4-methylbenzoyl) peroxide and an asymmetric dibenzoyl peroxide where the asymmetric dibenzoyl peroxide contains a 4-methylbenzoyl residue and a residue from the group consisting of benzoyl, 2-methylbenzoyl, 3-methylbenzoyl, 2,3-dimethylbenzoyl, 2,4-dimethylbenzoyl, 2,5-dimethylbenzoyl, 2,6-dimethylbenzoyl, 3,4-dimethylbenzoyl, 3,5-dimethylbenzoyl, 2,3,4-trimethylbenzoyl, 2,3,5-trimethylbenzoyl, 2,3,6-trimethylbenzoyl, 2,4,5-trimethylbenzoyl, 2,4,6-trimethylbenzoyl, 3,4,5-trimethylbenzoyl, 2,3,4,5-tetramethylbenzoyl, 2,3,4,6-tetramethylbenzoyl, 2,3,5,6-tetramethylbenzoyl and pentamethylbenzoyl. These particularly preferred preparations enable silicone rubber to be hot-vulcanized at a high cross-linking rate without the formation of chlorinated secondary products of the initiator.

The preparation according to the invention can contain other components in addition to the mixture of dibenzoyl peroxides and said components are preferably stabilizing and phlegmatizing compounds which prevent or slow down the decomposition of dibenzoyl peroxides at temperatures below the decomposition temperature. In addition to the mixture of dibenzoyl peroxides, the preparation preferably also contains water or silicone oil. Preparations are particularly preferred which contain 10 to 60% by weight of the mixture of dibenzoyl peroxides and 40 to 90% by weight silicone oil, in particular those preparations which contain less than 1% by weight water in addition to these percentages of dibenzoyl peroxides and silicone oil. The preparations of dibenzoyl peroxides and silicone oil with a small proportion of water are particularly suitable for initiating radical reactions in non-polar media in particular in melts or solutions of non-polar polymers.

The preparations according to the invention are preferably used for the hot cross-linking of silicone rubber wherein preparations are particularly preferably used which contain 10 to 60% by weight of the mixture of dibenzoyl peroxides and 40 to 90% by weight silicone oil. The preparations according to the invention allow the processing speed of the hot cross-linking of silicone rubber to be increased compared to preparations containing only one symmetric dibenzoyl peroxide because the decomposition temperature of the peroxides is reached more rapidly and the cross-linking occurs more rapidly.

The preparations according to the invention can be produced by mixing a symmetric dibenzoyl peroxide and an asymmetric dibenzoyl peroxide and optionally further components.

The preparations according to the invention are, however, preferably prepared by the process according to the invention in which a mixture of benzoyl chlorides containing a first benzoyl chloride and a second benzoyl chloride which is different therefrom is reacted with hydrogen peroxide wherein the mixture of benzoyl chlorides contains 70 to 99.7 mole % of the first benzoyl chloride and 0.3 to 30 mole % of the second benzoyl chloride. The term benzoyl chloride encompasses in the process according to the invention unsubstituted benzoyl chloride as well as substituted benzoyl chlorides. In this case the mixture of benzoyl chlorides preferably contains 90 to 98 mole % of the first benzoyl chloride and 2 to 10 mole % of the second benzoyl chloride. In order to bind the hydrogen chloride released during the reaction, it is preferable to add a base in an at least stoichiometric amount, particularly preferably aqueous sodium hydroxide solution before or during the reaction. The base is preferably added first together with hydrogen peroxide and the mixture of benzoyl chlorides is added during the reaction or hydrogen peroxide is added first and the benzoyl chlorides and the base are added together. Instead of the mixture of benzoyl chlorides it is possible to alternatively also add the two benzoyl chlorides separately in parallel.

The benzoyl chlorides and hydrogen peroxide are preferably used in the process according to the invention in a molar ratio of 2:1 to 2:4, particularly preferably 2:1 to 2:1.5. The molar ratio of benzoyl chlorides to base is preferably in a range of 1:1 to 1:2, particularly preferably 1:1 to 1:1.5. The base is preferably added in such a manner that it results in a pH in the range of 8 to 14, preferably 10 to 14 in the aqueous phase of the reaction mixture. The reaction is preferably carried out at a temperature in the range of −10 to 50° C., particularly preferably 0 to 40° C.

In a preferred embodiment of the process according to the invention bis-(2,4-dichlorobenzoyl) peroxide is used as the first benzoyl chloride. Bis-(2,4-dichlorobenzoyl) peroxide is particularly preferably used as the first benzoyl chloride and a compound from the group of benzoyl chloride, 2-chlorobenzoyl chloride, 3-chlorobenzoyl chloride, 4-chlorobenzoyl chloride, 2,3-dichlorobenzoyl chloride, 2,5-dichlorobenzoyl chloride, 2,6-dichlorobenzoyl chloride, 3,4-dichlorobenzoyl chloride, 3,5-dichlorobenzoyl chloride, 2,3,4-trichlorobenzoyl chloride, 2,3,5-trichlorobenzoyl chloride, 2,3,6-trichlorobenzoyl chloride, 2,4,5-trichlorobenzoyl chloride, 2,4,6-trichlorobenzoyl chloride, 3,4,5-trichlorobenzoyl chloride, 2,3,4,5-tetrachlorobenzoyl chloride, 2,3,4,6-tetrachlorobenzoyl chloride, 2,3,5,6-tetrachlorobenzoyl chloride and pentachlorobenzoyl chloride is used as the second benzoyl chloride.

In a further preferred embodiment of the process according to the invention 4-methylbenzoyl chloride is used as the first benzoyl chloride. 4-Methylbenzoyl chloride is particularly preferably used as the first benzoyl chloride and a compound from the group of benzoyl chloride, 2-methylbenzoyl chloride, 3-methylbenzoyl chloride, 2,3-dimethylbenzoyl chloride, 2,4-dimethylbenzoyl chloride, 2,5-dimethylbenzoyl chloride, 2,6-dimethylbenzoyl chloride, 3,4-dimethylbenzoyl chloride, 3,5-dimethylbenzoyl chloride, 2,3,4-trimethylbenzoyl chloride, 2,3,5-trimethylbenzoyl chloride, 2,3,6-trimethylbenzoyl chloride, 2,4,5-trimethylbenzoyl chloride, 2,4,6-trimethylbenzoyl chloride, 3,4,5-trimethylbenzoyl chloride, 2,3,4,5-tetramethylbenzoyl chloride, 2,3,4,6-tetramethylbenzoyl chloride, 2,3,5,6-tetramethylbenzoyl chloride and pentamethylbenzoyl chloride is used as the second benzoyl chloride.

The production of the preparations which in addition to the mixture of dibenzoyl peroxides also contain silicone oil is preferably carried out by the processes described in the examples of EP 235 537.

The following examples illustrate the invention without limiting the subject matter of the invention.

EXAMPLES

Determination of the Decomposition Temperature

The decomposition temperature of the peroxide-containing preparations was determined by differential thermoanalysis using a DSC20 instrument from the Mettler Company. For this about 3 mg sample was weighed into an open 40 µl aluminium crucible, incubated at 70° C. and heated at a rate of 1° C./min to 150° C. The decomposition temperature is the temperature at which the maximum exothermy was determined during the heating.

Example 1

Water-moist preparation containing bis-(2,4-dichlorobenzoyl) peroxide and 2-chlorobenzoyl-2,4-dichlorobenzoyl peroxide 125 g 2,4-dichlorobenzoyl chloride, 6.6 g 2-chlorobenzoyl chloride and 35 g isohexane were mixed and added while stirring and cooling at 20° C. to a mixture of 180 g water, 132 g 25% by weight sodium hydroxide solution and 21 g 70% by weight hydrogen peroxide. After the addition it was stirred for a further 30 minutes, filtered and the solid was washed with water.

Preparations of mixtures of 2,4-dichlorobenoyl chloride and 2-chlorobenzoyl chloride in which the proportion of 2-chlorobenzoyl chloride was 1, 2, 10 and 20% by weight instead of 5% by weight, were prepared in the same manner.

Table 1 shows the decomposition temperatures determined for the preparations compared to a preparation which only contained bis-(2,4-dichlorobenzoyl) peroxide as the peroxide.

TABLE 1

Decomposition temperature of water-moist preparations containing bis-(2,4-dichlorobenzoyl) peroxide and 2-chlorobenzoyl-2,4-dichlorobenzoyl peroxide

| Proportion of 2-chlorobenzoyl chloride in the employed mixture with 2,4-dichlorobenzoyl chloride in weight % | Decomposition temperature in ° C. |
| --- | --- |
| 0* | 101.5 |
| 1 | 100.5 |
| 2 | 99 |
| 5 | 97 |
| 10 | 94 |
| 20 | 88 |

*not according to the invention

Example 2

Preparation containing bis-(2,4-dichlorobenzoyl) peroxide, 2-chlorobenzoyl-2,4-dichlorobenzoyl peroxide and silicone oil A mixture of 854 g 2,4-dichlorobenzoyl chloride, 45 g 2-chlorobenzoyl chloride, 500 g silicone oil AK350 from the Wacker Company and 203 g isohexane was added to a mixture of 3.75 kg water, 485 g 35% by weight hydrogen peroxide, 243 g silicone oil AK 350 from the Wacker Company and 1134 g 25% by weight sodium hydroxide solution within 30 minutes while stirring vigorously and cooling to 10 to 20° C. It was stirred for a further 30 minutes, the aqueous phase was separated and the product was washed three times with 8 l water each time. The paste-like product was neutralized with a small amount of sodium hydroxide solution and kneaded in a kneader at 30° C. for 4 h while passing air through in order to evaporate residual moisture. Subsequently additional silicone oil was added in such an amount that the content of organic peroxide was in a range of 49 to 52% by weight.

Preparations of mixtures of 2,4-dichlorobenzoyl chloride and 2-chlorobenzoyl chloride in which the proportion of 2-chlorobenzoyl chloride was 1, 3, 10 and 20% by weight instead of 5% by weight, were prepared in the same manner.

Table 2 shows the decomposition temperatures determined for the preparations compared to a preparation which only contained bis-(2,4-dichlorobenzoyl) peroxide as the peroxide.

TABLE 2

Decomposition temperature of preparations containing bis-(2,4-dichlorobenzoyl) peroxide, 2-chlorobenzoyl-2,4-dichlorobenzoyl peroxide and silicone oil

| Proportion of 2-chlorobenzoyl chloride in the employed mixture with 2,4-dichlorobenzoyl chloride in weight % | Decomposition temperature in ° C. |
| --- | --- |
| 0* | 103 |
| 3 | 99 |
| 5 | 96 |
| 10 | 94 |
| 20 | 84 |

*not according to the invention

The SADT was determined using test H.4 of the "Recommendations on the transport of dangerous goods, Manual of tests and criteria" of the United Nations for the preparations which were prepared from mixtures of 2,4-dichlorobenzoyl chloride and 2-chlorobenzoyl chloride containing proportions of 2-chlorobenzoyl chloride of 3, 5 and 10% by weight. The SADT of all three preparations was more than 50° C. These preparations can therefore be stored and transported without cooling.

Example 3

Preparation containing bis-(2,4-dichlorobenzoyl) peroxide, 4-chlorobenzoyl-2,4-dichlorobenzoyl peroxide and silicone oil Example 2 was repeated but with 4-chlorobenzoyl chloride instead of 2-chlorobenzoyl chloride.

A decomposition temperature of 93° C. was determined for the preparation that was obtained.

A decomposition temperature of 137° C. was determined for an analogous preparation of di-4-chlorobenzoyl peroxide and silicone oil.

Example 4

Preparation containing bis-(2,4-dichlorobenzoyl) peroxide, 2,3-dichlorobenzoyl-2,4-dichlorobenzoyl peroxide and silicone oil The preparation was prepared analogously to example 2 using a mixture of 891.5 g 2,4-dichlorobenzoyl chloride and 8.2 g 2,3-dichlorobenzoyl chloride.

A decomposition temperature of 100° C. was determined for the preparation that was obtained.

Example 5

Preparation containing bis-(2,4-dichlorobenzoyl) peroxide, 2,4-dichlorobenzoyl-2,6-dichlorobenzoyl peroxide and silicone oil The preparation was prepared analogously to example 2 using a mixture of 891 g 2,4-dichlorobenzoyl chloride and 9.0 g 2,6-dichlorobenzoyl chloride.

A decomposition temperature of 102° C. was determined for the preparation that was obtained.

Example 6

Preparation containing bis-(2,4-dichlorobenzoyl) peroxide, 2,4-dichlorobenzoyl-3,4-dichlorobenzoyl peroxide and silicone oil The preparation was prepared analogously to example 2 using a mixture of 891 g 2,4-dichlorobenzoyl chloride and 12.3 g 3,4-dichlorobenzoyl chloride.

A decomposition temperature of 99° C. was determined for the preparation that was obtained.

Example 7

Preparation containing di-(4-methylbenzoyl) peroxide, 2-methylbenzoyl-4-methylbenzoyl peroxide and silicone oil A mixture of 1040 g 4-methylbenzoyl chloride, 114 g 2-methylbenzoyl chloride, 589 g silicone oil AK 350 from the Wacker Company and 247 g isohexane were added to a mixture of 6.29 kg water, 507 g 35% by weight hydrogen peroxide, 270 g silicone oil AK 350 from the Wacker Company and 1890 g 25% by weight sodium hydroxide solution within 30 minutes while stirring vigorously and cooling to 10 to 20° C. It was stirred for a further 30 minutes, the aqueous phase was separated and the product was washed three times with 10 l water each time. The paste-like product was neutralized with a small amount of sodium hydroxide solution and kneaded in a kneader at 30° C. for 4 h while passing air through in order to evaporate residual moisture. Subsequently additional silicone oil was added in such an amount that the content of organic peroxide was in a range of 49 to 52% by weight.

A preparation of a mixture of 4-methylbenzoyl chloride and 2-methylbenzoyl chloride in which the proportion of 2-methylbenzoyl chloride was 20% by weight instead of 10% by weight, was prepared in the same manner.

Table 3 shows the decomposition temperatures determined for the preparations compared to a preparation which only contained di-(4-methylbenzoyl) peroxide as the peroxide.

TABLE 3

Decomposition temperature of preparations containing di-(4-methylbenzoyl) peroxide, 2-methylbenzoyl-4-methylbenzoyl peroxide and silicone oil

| Proportion of 2-methylbenzoyl chloride in the employed mixture with 4-methylbenzoyl chloride in weight % | Decomposition temperature in ° C. |
|---|---|
| 0* | 136 |
| 10 | 128 |
| 20 | 123 |

*not according to the invention

The invention claimed is:

1. A composition for initiation of radical reactions comprising a mixture of dibenzoyl peroxides comprising from 80 to 99.7 mol % of a symmetric dibenzoyl peroxide and 0.3 to 20 mol % of asymmetric dibenzoyl peroxides,
    wherein the symmetric dibenzoyl peroxide is bis(2,4-dichlorobenzoyl) peroxide,
    and wherein the asymmetric dibenzoyl peroxides comprise a 2,4-dichlorobenzoyl group and a group selected from the group consisting of 2-chlorobenzoyl, 3-chlorobenzoyl, 4-chlorobenzoyl, 2,3-dichlorobenzoyl, 2,5-dichlorobenzoyl, 2,6-dichlorobenzoyl, 3,4-dichlorobenzoyl, 3,5-dichlorobenzoyl, 2,3,4-trichlorobenzoyl, 2,3,5-trichlorobenzoyl, 2,3,6-trichlorobenzoyl, 2,4,5-trichlorobenzoyl, 2,4,6-trichlorobenzoyl, 3,4,5-trichlorobenzoyl, 2,3,4,5-tetrachlorobenzoyl, 2,3,4,6-tetrachlorobenzoyl, 2,3,5,6-tetrachlorobenzoyl or pentachlorobenzoyl.

2. The composition of claim 1, comprising 10 to 60 wt % of the mixture of dibenzoyl peroxides and 40 to 90 wt % silicone oil.

3. The composition of claim 1 for hot cross-linking silicone rubber.

4. The composition of claim 1, comprising 80 to 97 mol % of the symmetric dibenzoyl peroxide and 3 to 20 mol % of the asymmetric dibenzoyl peroxides.

5. A method for producing the mixture of dibenzoyl peroxides of the composition for initiation of radical reactions of claim 1, comprising:
    converting a mixture of benzoyl chlorides to the mixture of benzoyl peroxides, comprising reacting the mixture of benzoyl chlorides comprising a first benzoyl chloride and a second benzoyl chloride different from the first benzoyl chloride, with hydrogen peroxide, wherein the mixture of benzoyl chlorides comprises 90 to 99.7 mol % of the first benzoyl chloride and 0.3 to 10 mol % of the second benzoyl chloride, and wherein the first benzoyl chloride is 2,4-dichlorobenzoyl chloride.

6. The method of claim 5, wherein the mixture of benzoyl chlorides comprises 90 to 98 mol % of the first benzoyl chloride and 2 to 10 mol % of the second benzoyl chloride.

7. The method of claim 5, wherein the second benzoyl chloride is 2-chlorobenzoyl chloride, 3-chlorobenzoyl chloride, 4-chlorobenzoyl chloride, 2,3-dichlorobenzoyl chloride, 2,5-dichlorobenzoyl chloride, 2,6-dichlorobenzoyl chloride, 3,4-dichlorobenzoyl chloride, 3,5-dichlorobenzoyl chloride, 2,3,4-trichlorobenzoyl chloride, 2,3,5-trichlorobenzoyl chloride, 2,3,6-trichlorobenzoyl chloride, 2,4,5-trichlorobenzoyl chloride, 2,4,6-trichlorobenzoyl chloride, 3,4,5-trichlorobenzoyl chloride, 2,3,4,5-tetrachlorobenzoyl chloride, 2,3,4,6-tetrachlorobenzoyl chloride, 2,3,5,6-tetrachlorobenzoyl chloride or pentachlorobenzoyl chloride.

* * * * *